(12) United States Patent
Kawanishi et al.

(10) Patent No.: US 7,660,030 B2
(45) Date of Patent: Feb. 9, 2010

(54) RECIPROCATING OPTICAL MODULATION SYSTEM

(75) Inventors: Tetsuya Kawanishi, Tokyo (JP); Masayuki Izutsu, Tokyo (JP); Takahide Sakamoto, Tokyo (JP); Masahiro Tsuchiya, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 152 days.

(21) Appl. No.: 12/063,436

(22) PCT Filed: Aug. 9, 2006

(86) PCT No.: PCT/JP2006/315756
§ 371 (c)(1),
(2), (4) Date: Feb. 10, 2008

(87) PCT Pub. No.: WO2007/018240
PCT Pub. Date: Feb. 15, 2007

(65) Prior Publication Data
US 2009/0103163 A1  Apr. 23, 2009

(30) Foreign Application Priority Data
Aug. 10, 2005 (JP) ............................. 2005-232640

(51) Int. Cl.
*G02B 1/01* (2006.01)
(52) U.S. Cl. .................. 359/276; 359/245; 359/279
(58) Field of Classification Search .................. 359/276, 359/279, 245, 238, 237, 278
See application file for complete search history.

(56) References Cited

U.S. PATENT DOCUMENTS 5,721,796 A * 2/1998 de Barros et al. ............. 385/37

(Continued)

FOREIGN PATENT DOCUMENTS

JP  2000-267056  9/2000

(Continued)

OTHER PUBLICATIONS

International Preliminary Report on Patentability dated Feb. 21, 2008 for International Application No. PCT/JP2006/315756, international filing date Aug. 9, 2006.

(Continued)

*Primary Examiner*—Timothy J Thompson
(74) *Attorney, Agent, or Firm*—Myers Wolin, LLC (57) ABSTRACT

In order to provide a reciprocating optical modulation system capable of obtaining a broad bandwidth, a reciprocating optical modulation system (1) of the present invention is basically provided with an optical modulator (2) modulating an output light by controlling one of an intensity, a phase and a frequency of an input light; a first fiber grating (3) transmitting a light of a predetermined frequency domain among lights inputted to and outputted from the optical modulator while reflecting lights of other frequencies; a second fiber grating (4) transmitting a light of a predetermined frequency domain among lights inputted to and outputted from the optical modulator while reflecting lights of other frequencies; and a signal source (5) generating a modulating signal to be inputted to the optical modulator (2).

5 Claims, 5 Drawing Sheets

U.S. PATENT DOCUMENTS

| | | | |
|---|---|---|---|
| 6,219,469 | B1 | 4/2001 | Minakata et al. |
| 6,411,747 | B2 | 6/2002 | Rangaraj |
| 6,556,727 | B2 | 4/2003 | Minakata et al. |
| 6,600,588 | B2 | 7/2003 | Kawanishi |
| 6,674,565 | B2 | 1/2004 | Kondo et al. |
| 6,707,586 | B2 | 3/2004 | Kawanishi |
| 6,791,733 | B2 | 9/2004 | Kawanishi et al. |
| 6,819,475 | B2 | 11/2004 | Kawanishi |
| 2003/0138197 | A1* | 7/2003 | Wakabayashi et al. ........ 385/27 |
| 2006/0263007 | A1* | 11/2006 | Hsu et al. ..................... 385/37 |

FOREIGN PATENT DOCUMENTS

| | | |
|---|---|---|
| JP | 2002-148572 | 5/2002 |
| JP | 2002-148666 | 5/2002 |

OTHER PUBLICATIONS

Kawanishi, T. et al., "Resonant-type optical modulator with planar structures," The Institute of Electronics, Information and Communication Engineers, Technical Report of IEICE, LQE2001-3 (May 2001), pp. 13-18.

Kawanishi, T., et al., "Reciprocating Optical Modulation for Millimeter-Wave Generation by Using a Dual-Section Fiber Bragg Grating," Journal of Lightwave technology, vol. 20, No. 8, Aug. 2002, pp. 1408-1415.

Kawanishi, T., et al., "Integrated Reciprocating Optical Modulator for Optical High-Order Sideband Generation," Japanese Journal of Applied Physics, vol. 43, No. 8B, 2004, pp. 5792-5794.

Kawanishi, T., et al., "Reciprocating optical modulator with resonant modulating electrode," Electronics Letters, vol. 41, No. 5, Mar. 3, 2005.

Shimakura, Y., et al., "60GHz-band ROF transmitter with Reciprocating Optical Modulator," The Institute of Electronics, Information and Communication Engineers, IEICE Technical Report, Jul. 2005, pp. 13-18.

Kawanishi, T., et al., "160 GHz reciprocating optical modulator using uniform fiber Bragg gratings," The Institute of Electronics, Information and Communication Engineers, IEICE Technical Report, vol. 205, No. 183, Jul. 2005.

Nishihara, H. et al., "Optical Integrated Circuits," (revised and updated edition), Ohmsha, 5th Ed., May 20, 2002; pp. 119-120.

* cited by examiner

RECIPROCATING OPTICAL MODULATION SYSTEM

CROSS REFERENCE TO RELATED APPLICATIONS

The present disclosure is a national phase filing under 35 U.S.C. §371 of international patent application No. PCT/JP2006/315756 filed on Aug. 9, 2006, which claims priority to Japanese Patent Application No. 2005-232640 filed on Aug. 10, 2005, the disclosures of which are expressly incorporated herein by reference in its entireties.

FIELD OF THE INVENTION

The present invention relates to a reciprocating optical modulation system and the like. More particularly, the present invention relates to a reciprocating optical modulation system capable of obtaining a broad bandwidth by using a fiber grating as an optical filter and a radio signal generator utilizing such a reciprocating optical modulation system.

DESCRIPTION OF THE RELATED ART

Figure 11:
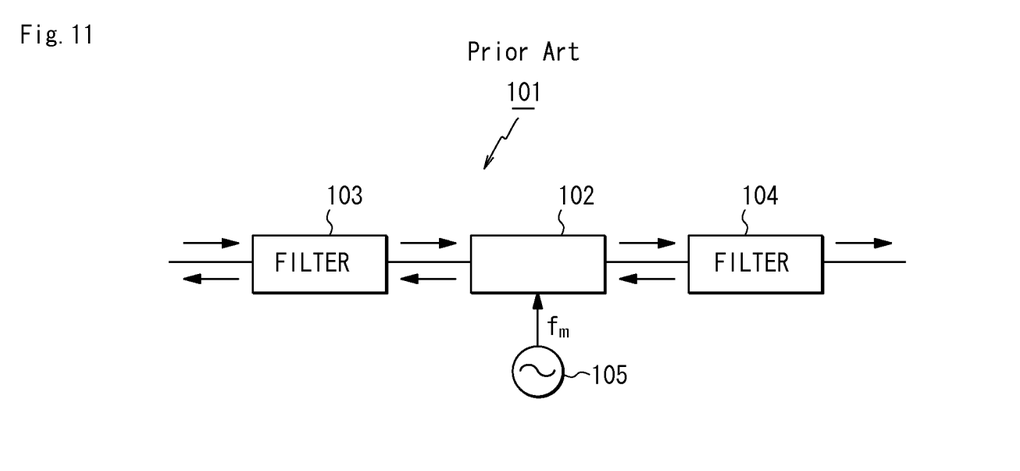
FIG. 11 is a block diagram showing a basic arrangement of a conventional multiplying optical modulator.

A multiplying optical modulator has been known (see Patent Documents 1-4 below). FIG. 11 is a block diagram showing a basic arrangement of a conventional multiplying optical modulator. As shown in FIG. 11, a basic arrangement of an optical multiplying modulator (101) is provided with an optical modulator (102), a first filter (103) for controlling a light inputted to and outputted from the optical modulator (102), a second filter (104) for controlling a light inputted to and outputted from the optical modulator (102), and a modulating signal source (105) for inputting a modulating signal to the optical modulator (102). The first filter (103) is a narrow-band filter that has a characteristic of reflecting a light marginally deviated from a certain frequency $f_0$ and transmitting lights having other frequencies. Also, the optical modulator (102) is an optical intensity modulator (or an optical phase modulator) capable of modulating an input light in whichever direction of a leftward direction and a rightward direction by a characteristic of a modulating frequency $f_m$. The second filter (104) is a filter (bandlimiting filter) having a characteristic of transmitting a light having a specific frequency (e.g. the third order sideband wave) and reflecting other lights.

While high-order sideband groups can be systematically obtained by a conventional reciprocating optical modulator, the bandwidth was limited since a band limiting filter was used as the filter.

[Patent Document 1] Japanese Patent No. 3404528
[Patent Document 2] Japanese Patent No. 3343241
[Patent Document 3] Japanese Patent Application Laid-Open No. 2002-148572
[Patent Document 4] Japanese Patent No. 3496053

SUMMARY OF THE INVENTION

It is an object of the present invention to provide a reciprocating optical modulation system whose modulation efficiency does not decrease and a reciprocating optical modulation system capable of obtaining a broad bandwidth.

It is an object of the present invention, different from the above-mentioned object, to provide a radio signal generator utilizing a reciprocating optical modulation system whose modulation efficiency does not decrease and a reciprocating optical modulation system capable of obtaining a broad bandwidth.

In order to achieve the above-mentioned object, a reciprocating optical modulation system (1) according to a first aspect of the present invention basically comprises: an optical modulator (2) modulating an output light by controlling one of an intensity, a phase and a frequency of an input light; a first fiber grating (3) transmitting a light of a predetermined frequency domain among lights inputted to and outputted from the optical modulator while reflecting lights of other frequencies; a second fiber grating (4) transmitting a light of a predetermined frequency domain among lights inputted to and outputted from the optical modulator while reflecting lights of other frequencies; and a signal source (5) generating a modulating signal to be inputted to the optical modulator (2). Any of a uniform fiber grating, a chirp grating and a multi-section grating is used as at least one of the first fiber grating (3) and the second fiber grating (4).

In some cases, a uniform FBG generates, besides a main reflection bandwidth (main lobe), a plurality of reflection bandwidths (side lobes) on the periphery of the main lobe. Accordingly, a uniform FBG was regarded as being difficult to be effectively utilized in optical communications such as digital optical communications. In the present invention, extremely steep filter characteristics existing between the main lobe and the side lobes as well as between the side lobes in the uniform FBG were noted. Namely, by making these narrow transmission bandwidths of the uniform FBG the transmission bandwidths of an input light and an output light of a reciprocating multiplication optical modulation system, steep filter characteristics that are difficult to realize with other systems are obtained. It is to be noted that the uniform FBGs are easy to manufacture, so that a system cost can be made lower by using the uniform FBGs.

Use of a chirped grating with an elongated grating portion broadens the reflection bandwidth, so that a system with a broad bandwidth can be presented. Also, by controlling a characteristic of a chirped grating, a deviation of modulation timing when an optical signal reciprocates within the system and the like can be prevented, and a situation where the modulation efficiency worsens can be prevented.

Use of a multi-section grating with an elongated grating portion broadens the reflection bandwidth, so that a system with a broad bandwidth can be presented. Also, by controlling a characteristic of a multi-section grating, a deviation of modulation timing when an optical signal reciprocates within the system and the like can be prevented, and a situation where the modulation efficiency worsens can be prevented.

In order to achieve the above-mentioned object, a radio signal generator (21) according to a second aspect of the present invention basically comprises: a modulated optical signal generator (reciprocating optical modulation system (1)) (22) connectable to a light source; a photodetector (23) detecting an output light from the modulated optical signal generator; and an antenna (24) converting an optical signal detected by the photodetector into a radio signal. The radio signal generator controls a modulating frequency of the modulated optical signal generator to control a frequency of an optical signal outputted from the multiplying optical modulator, and controls a frequency of the radio signal emitted from the antenna to generate a radio signal of a predetermined frequency. It is to be noted that a modulator (25) such as an optical intensifier for modulating the optical signal of the modulated optical signal generator may be provided between the modulated optical signal generator and the photodetector, a light source (26) for obtaining a light to be inputted to the modulated optical signal generator may be provided, and the components may be connected with each other with a transmission line (27) such as an SMF (single mode fiber).

According to the present invention, it is made possible to present a reciprocating optical modulation system whose modulation efficiency does not decrease and a reciprocating optical modulation system capable of obtaining a broad bandwidth.

According to the present invention, it is made possible to present a radio signal generator utilizing a reciprocating optical modulation system whose modulation efficiency does not decrease and a reciprocating optical modulation system capable of obtaining a broad bandwidth.

BRIEF DESCRIPTION OF THE DRAWINGS

FIGS. 10A and 10B are measurement results showing states of an output radio signal from a radio signal generator.

BEST MODE OF CARRYING OUT THE INVENTION

1. Reciprocating Optical Modulation System

Figure 1:
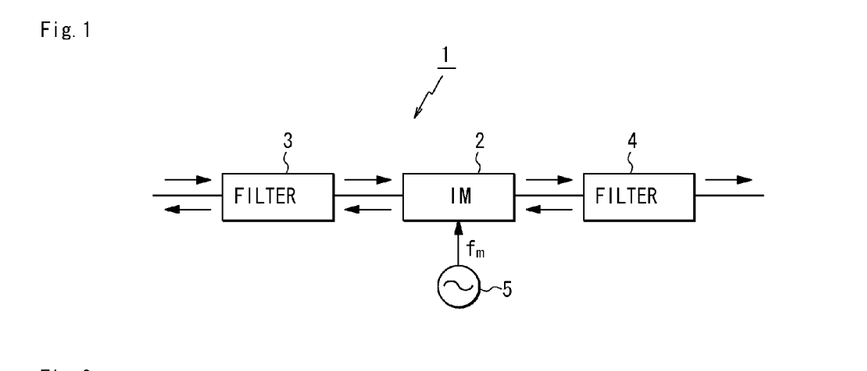
FIG. 1 is a block diagram showing a basic arrangement of a reciprocating optical modulation system of the present invention.

FIG. 1 is a block diagram showing a basic arrangement of a reciprocating optical modulation system of the present invention. As shown in FIG. 1, a reciprocating optical modulation system (1) of the present invention basically comprises: an optical modulator (2) modulating an output light by controlling one of an intensity, a phase and a frequency of an input light; a first fiber grating (3) transmitting a light of a predetermined frequency domain among lights inputted to and outputted from the optical modulator while reflecting lights of other frequencies; a second fiber grating (4) transmitting a light of a predetermined frequency domain among lights inputted to and outputted from the optical modulator while reflecting lights of other frequencies; and a signal source (5) generating a modulating signal to be inputted to the optical modulator (2). Any of a uniform fiber grating, a chirp grating and a multi-section grating is used as at least one of the first fiber grating (3) and the second fiber grating (4). The optical modulator (2) and the signal source (5) are electrically connected with a copper wire or the like so as to exchange signals. A light source (not shown), the fiber gratings, the optical modulator and the like are optically connected with waveguides such as an optical fiber.

In the reciprocating optical modulation system of the present invention, except for the first fiber grating (hereinafter, also referred to as "FBG") (3) and the second FBG, components of a publicly known reciprocating optical modulator (e.g., Patent Documents 1-3 described above) can be utilized as appropriate. For example, as the optical modulator (2), an intensity modulator or a phase modulator can be used.

1.1. Optical Modulator

An optical modulator is an apparatus for applying modulation to at least one of a frequency of light, an intensity of light, and a phase of light. For such an optical modulator, a frequency modulator, an intensity modulator, and a phase modulator can be mentioned. The optical modulator (2) is connected to the signal source (5) such as a radio frequency (RF) signal source that generates a modulating signal. A light passing through this optical modulator (2) has its frequency shifted by a predetermined amount in the same way as the optical modulator in a conventional optical multiplying modulator. As an optical modulator, one including a waveguide provided on a substrate such as an LN substrate and an electrode for applying an electric field to the waveguide can be mentioned.

It is to be noted that optical modulators include a resonant-type modulator and a traveling-wave-type modulator. A resonant-type optical modulator is a modulator that performs a modulation by using a resonance of a modulating signal. As the resonant-type modulator, a publicly known resonant-type modulator can be adopted. For example, a resonant-type modulator described in Japanese Patent Application Laid-Open No. 2002-268025, and "T. Kawanishi, S. Oikawa, M. Izutsu, "Optical Modulator with Planar Structure", TECHNICAL REPORT OF IEICE, LQE2001-3 (2001-05)" can be adopted. The traveling-wave-type optical modulator is a modulator that guides an optical wave and an electric signal in the same direction and modulates light while the optical wave and the electric signal are guided (e.g., Hiroshi Nishihara, Haruna Masamitsu, Toshiaki Suhara, "optical integrated circuit" (revised and updated edition), Ohmsha, pages 119 to 120). A publicly known traveling-wave-type electrode such as those disclosed in Japanese Patent Application Laid-Open Nos. 11-295674, 11-295674, 2002-169133, 2002-40381, 2000-267056, 2000-471159, and 10-133159, for example, can be used as the traveling-wave-type modulator. The traveling-wave-type modulator is preferable since modulations of the same characteristic are enabled for lights entering from any direction by inputting the modulating signals from electrodes at both ends.

Let a time for the light to propagate between the two optical filters (namely, a time for a reflection to occur) be T [s]. A modulating frequency fm [Hz] where an effective reciprocating modulation can be applied is 1/T multiplied by an even number or an odd number. Therefore, 1/T multiplied by an even number or an odd number is preferable as the fm. In the case where an in-phase modulation by an optical modulator sandwiched by two optical filters is applied in either of the case where a light travels in forward direction and in backward direction, 1/T multiplied by an even number is preferable as the fm. In the case where a reversed-phase modulation by an optical modulator sandwiched by two optical filters is applied in either of the case where a light travels in forward direction and in backward direction, 1/T multiplied by an odd number is preferable as the fm. Also, a certain range centered around the preferable frequency can be mentioned as a bandwidth where a modulation by the modulating signal is enabled, and shifting the modulating frequency within this range can be mentioned. Between 0 and 1/T inclusive can be mentioned as such a shifting range of a frequency. Also, between 0 and 1/4T inclusive, between 0 and 1/10T inclusive, between 0 and 1/100T inclusive, between 1/100T and 1/T inclusive, between 1/100T and 1/4T inclusive, between 1/100T and 1/10T inclusive, between 1/10T and 1/4T inclusive, between 1/10T and 1/T inclusive, and between 1/4T and 1/T inclusive can be mentioned.

1.2. Fiber Grating

For the first FBG (3) or the second FBG (4), use of a uniform fiber grating, chirp grating or multi-section grating can be mentioned. While the uniform fiber gratings may be used as the first FBG (3) and the second FBG (4), the chirp gratings may be used as the first FBG (3) and the second FBG (4), or the multi-section gratings may be used as the first FBG (3) and the second FBG (4). Also, the fiber grating may be capable of providing modulation. Hereinafter, the FBG will be described. The FBG can be obtained, for example, by irradiating ultraviolet rays through a phase mask to change the core refractive index thereof by a predetermined pitch.

Figure 2:
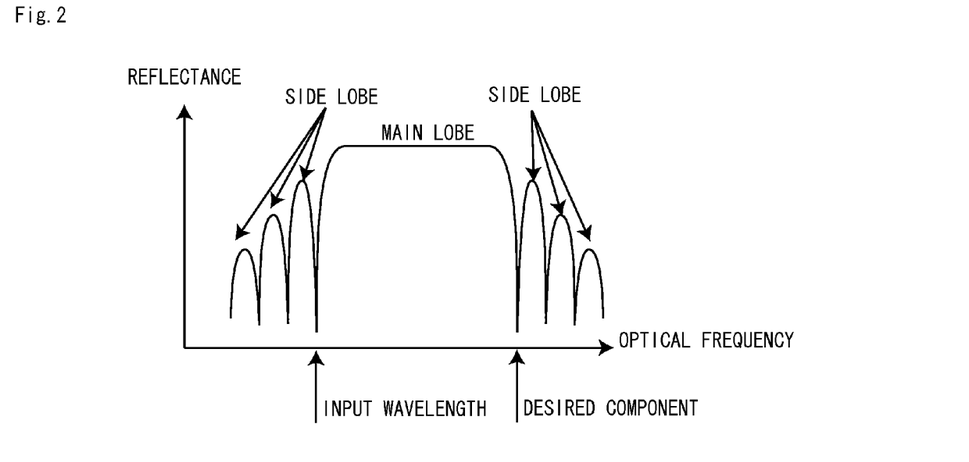
FIG. 2 is a schematic diagram showing an optical frequency and reflection ratio of a uniform FBG.

A uniform FBG is an FBG whose grating has a cycle, refractive index and the like that are uniform. FIG. 2 is a schematic diagram showing an optical frequency and a reflectance of a uniform FBG. As shown in FIG. 2, there are cases where the uniform FBG generates besides a main reflection bandwidth (main lobe) a plurality of unnecessary reflection bandwidths (side lobes) on the periphery of the main lobe. Accordingly, a uniform FBG was regarded as being difficult to be effectively utilized in optical communications such as digital optical communications. In the present invention, extremely steep filter characteristics existing between the main lobe and the side lobe as well as between the side lobes in the uniform FBG were noted. Namely, upon using the uniform FBG, the narrow transmission bandwidths between the lobes of the uniform FBG are made the transmission bandwidths of an input light and an output light of a reciprocating multiplication optical modulation system. By intentionally using regions of the uniform FBG that are not usually used, steep filter characteristics that are difficult to realize with other systems can be obtained. It is to be noted that the uniform FBGs are easy to manufacture, so that a system cost can be made lower by using the uniform FBGs.

It is to be noted that for a pitch of a grating, an appropriate interval corresponding to a wavelength of a subject light can be used. For example, 100 nm-1000 nm can be mentioned, while 300 nm-800 nm is acceptable. Also, as a refractive index difference, $1\times10^{-6}$-$1\times10^{-2}$ can be mentioned, while $1\times10^{-5}$-$5\times10^{-3}$ and $1\times10^{-4}$-$1\times10^{-3}$ are acceptable.

As for bandwidths between the lobes, a bandwidth where the intensity is reduced to ⅕ or less than a maximum intensity for each of an adjacent lobe (main lobe or side lobe) can be mentioned. The intensity may be reduced to 1/10 or less, 1/20 or less, and 1/100 or less than the maximum intensity.

A chirp grating has a refraction index cycle and grating cycle changed in a longitudinal direction of the FBG. By the chirp grating, a reflecting position can be varied according to a wavelength of an input signal. Additionally, by using a long chirped grating whose grating portion is elongated, there is a merit that a reflection bandwidth broadens. However, there is a problem that since the reflecting position shifts according to the wavelength of the optical signal, a timing of the light reflected within the system is shifted by the wavelength of the optical signal.

Therefore, a chirp grating is preferably designed so that the gratings of the first and the second FBGs (3, 4) viewed from the optical modulator are symmetrical. Namely, the first and the second FBGs (3, 4) are provided with gratings at the same intervals and are made to have refraction index changed at the same intervals in the direction towards the optical modulator (or direction moving away from the optical modulator). This can be realized by preparing two identical chirped FBGs to be set so that the sides of a shorter cycle (or longer cycle) are faced via the optical modulator.

Figure 3:
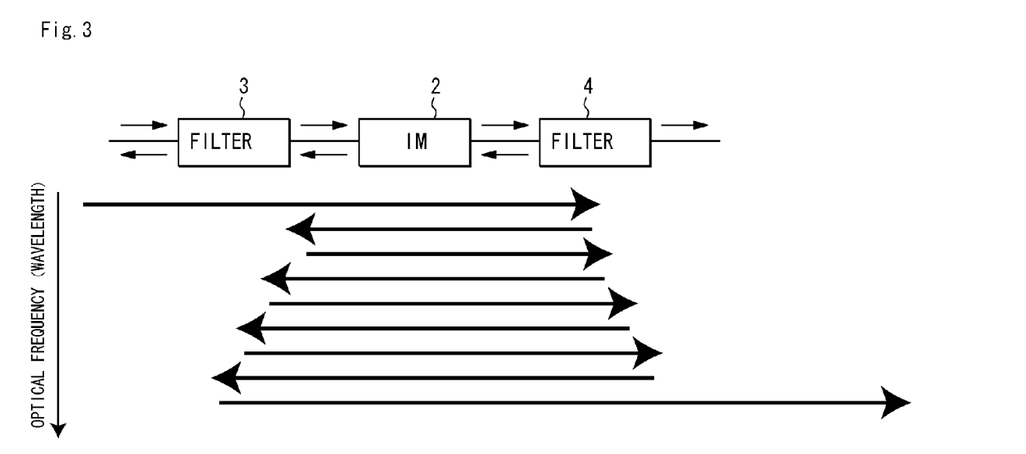
FIG. 3 is a schematic diagram showing how an optical signal is reflected when two chirped FBSs are set symmetrical with each other with respect to an optical modulator.

FIG. 3 is a schematic diagram showing how the optical signal is reflected when the two chirped FBGs are set symmetrical with each other with respect to the optical modulator. In FIG. 3, an example where the reflecting positions are gradually made far apart is shown, while it may be one that the reflecting positions are gradually made narrower. As shown in FIG. 3, by setting the two chirped FBGs symmetrical with each other with respect to the optical modulator, an optical modulation by the optical modulator (2) is theoretically applied always at a half of a time required for a reciprocation between the two FBGs (3, 4), so that the phases of the modulation applied to the optical signal are almost the same and the decrease of the modulation efficiency can be made small even if the optical signal reciprocates between the two FBGs (3,4) and the optical modulation is repeatedly applied. Ideally, supposing that the optical modulator's modulation frequency is f, a time T required for the reciprocation is represented by a relationship of T=n/(2f), where n is an integer. However, as shown in FIG. 3, one of the problems is that the time required for reciprocating shifts when the optical signal repeats the reflection within the system. Thus, a little time shift occurs when a number of reciprocation is increased, however, the advantage that the modulation efficiency can be maintained is still significant.

In another example of using chirped FBGs as the first and the second FBGs (3, 4), the chirp gratings are preferably designed so that the gratings of the first and the second FBGs (3, 4) viewed from the optical modulator are opposite to each other. Namely, chirped FBGs of the same properties are used for the first and the second FBGs (3, 4) and are not symmetrically set when viewed from the optical modulator but are set so that the changes of the gratings are opposite to each other when viewed from the optical modulator.

Figure 4:
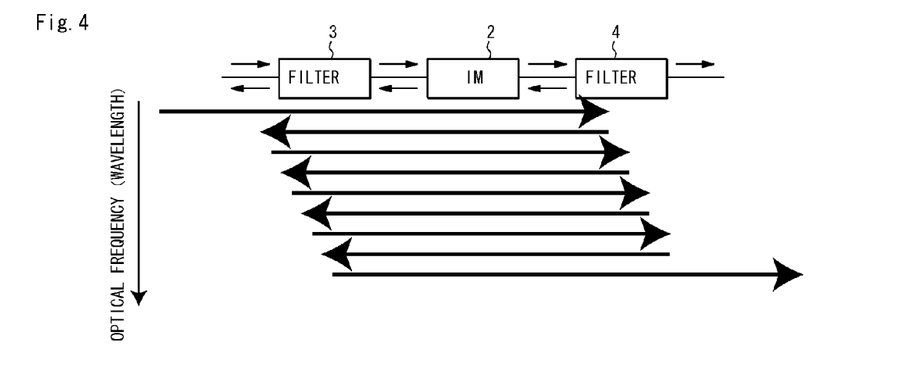
FIG. 4 is a schematic diagram showing how an optical signal is reflected when gratings of a first and second FBSs are designed to be opposite to each other.

FIG. 4 is a schematic diagram showing how the optical signal is reflected when the gratings of the first and the second FBGs are designed to be opposite to each other when viewed from the optical modulator. With such a setup, the relationship between the modulation frequency and the time required for a reciprocation in the system can be maintained constant, so that the modulation efficiency does not decrease so much even if the number of reciprocating the optical signal is increased. However, the timing of modulation applied by the optical modulator is gradually shifted so that the modulation efficiency gradually decreases.

It is to be noted that while usually the pitches of the grating of the chirped FBG are gradually changed, one with appropriate intervals may be used according to the wavelength of the subject light. For example, 100 nm-1000 nm can be mentioned, while 300 nm-800 nm is acceptable. Also, as the difference of refraction index of the grating against the core, $1\times10^{-6}$-$1\times10^{-2}$ can be mentioned, while $1\times10^{-5}$-$5\times10^{-3}$ and $1\times10^{-4}$-$1\times10^{-3}$ are acceptable.

A multi-section FBG is an FBG in which changes in wavelengths and changes in reflection points are discrete. Namely, while optical signals with wavelength components within a certain range are reflected at a same reflection point, reflection points change discretely for wavelength components in a different range.

By using the multi-section FBG in the same way as the aforementioned chirped FBG and further in a way that solves the problem of the chirped FBG, an ideal filtering can be achieved. For example, when two multi-section FBGs are setup so that the pitches and the like of the gratings are symmetrical with one another with respect to the optical modulator, the relationship between the modulation frequency and the time required for the reciprocation in the system can be maintained constant in the same way as in the above-mentioned chirped FBG, so that the modulation efficiency does not decrease so much even if the number of reciprocating the optical signal is increased. Although the wavelength of the optical signal changes when the optical signal reciprocates in the system, the gratings may be adjusted so as to satisfy T=n/(2f) when reflected at a same reflection point and to satisfy T=n'/(2f) when the reflection point is changed. Thus, a deterioration of the modulation efficiency due to the shift in time required for the reciprocation can be prevented.

Also, it may be designed so that the gratings of the first and the second FBGs (3, 4) viewed from the optical modulator is opposite to each other. When the multi-section FBGs are thus designed, in the same way as the case of the aforementioned chirped FBG, the relationship between the modulation frequency and the time required for the reciprocation in the system can be maintained constant, so that the modulation efficiency does not decrease so much even if the number of reciprocating the optical signal is increased. Also, by adjusting the positions of the gratings so that the shift in the timing of the modulation applied by the optical modulator becomes an integral multiple of a cycle of the modulating signal (preferably multiplied by 1), the decrease in the modulation efficiency can be suppressed.

It is to be noted that while the pitches of the grating of the multi-section FBG are usually adjusted according to a purpose, pitches of appropriate intervals according to the wavelength of the subject light may be used. For example, 100 nm-1000 nm can be mentioned, while 300 nm-800 nm is acceptable. Also, as the difference of refraction index of the grating against the core, $1 \times 10^{-6}$-$1 \times 10^{-2}$ can be mentioned, while $1 \times 10^{-5}$-$5 \times 10^{-3}$ and $1 \times 10^{-4}$-$1 \times 10^{-3}$ are acceptable.

1.3. Light Source

A publicly known light source can be adopted for a light source. A preferable light source is a diode, a laser diode, or the like.

2. Basic Operation of Reciprocating Optical Modulation System

Figures 5, 5A, 5B, 5C, 5D, 5E, 5F, 5G:
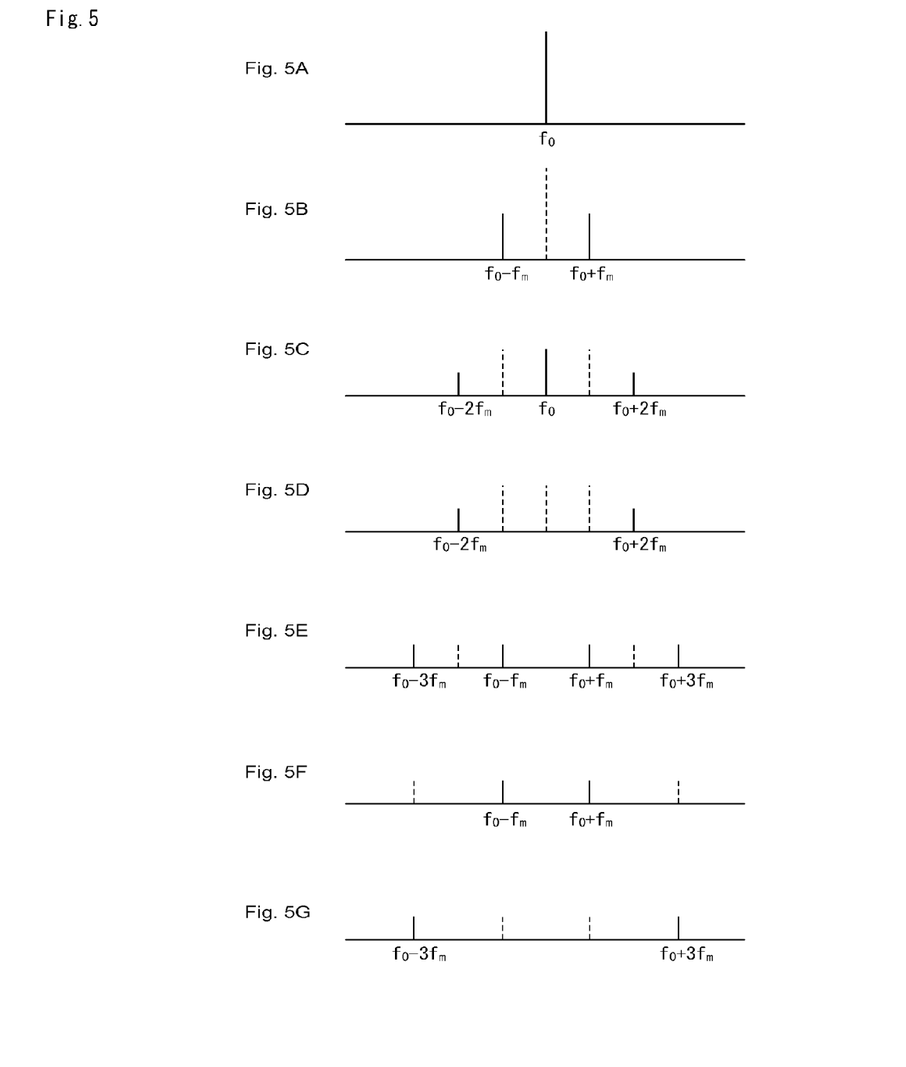
FIGS. 5A-5G are schematic diagrams showing a basic operation of an optical multiplying modulation system.

Hereinafter, a basic operation (mode of modulation) of the reciprocating optical modulation system of the present invention will be described. A basic operation of an optical multiplying modulator is as follows: FIGS. 5A-5G are schematic diagrams showing a basic operation of an optical multiplying modulation system. As shown in FIG. 5A, an input light has a single frequency $f_0$ [Hz]. The light of the frequency $f_0$ having been inputted through the first FBG (3) is modulated by the optical modulator (2) and generates sideband waves as shown in FIG. 5B. (It is to be noted that for the sake of simplicity, it is supposed that only the carrier wave $f_0$ and the primary sideband wave group ($f_0-f_m$ and $f_0+f_m$) are generated.) The carrier wave and the primary sideband wave group are reflected by the second FBG (4) and pass through the optical modulator again. Upon passing through the optical modulator, these lights are modulated and outputted as lights having spectra shown in FIG. 5C. Among these lights, the carrier wave $f_0$ passes through the first FBG (3). Namely, spectra of lights reflected by the first FBG (3) are as shown in FIG. 5D. These lights reflected by the first FBG (3) pass though the optical modulator (2) again. Then, these lights are modulated by the optical modulator and become lights having spectra shown in FIG. 5E. Namely, the light group shown in FIG. 5E has the primary sideband wave group ($f_0 \pm f_m$) and the third-order sideband wave group ($f_0 \pm 3f_m$). Among these, the primary sideband wave group shown in FIG. 5F is reflected by the second FBG (4). It is to be noted that these light groups are lights having the same frequencies with those of the light groups shown in FIG. 5B. On the other hand, the third-order sideband waves shown in FIG. 5G pass through the second FBG (104). Thus, the third-order sideband waves are outputted from the optical multiplying modulator as output lights. By controlling a transmitting region of the second FBG (4), the frequencies of the lights obtained as the output lights can be controlled. Namely, by thus using the optical multiplying modulator, a high-order sideband wave group can be systematically obtained.

In the present invention, two fiber gratings are used as the optical filters, so that a reciprocating optical modulation system having a broad bandwidth can be provided as will be verified by examples described later, and additionally the accuracy of the spectra is extremely high compared to the conventional system.

It is to be noted that by changing the frequency $f_m$ of the modulating signal outputted from the signal source (5), frequencies of the output lights outputted from the optical modulator and the reciprocating optical modulation system can be changed. Also, when the modulating signal applied to the optical modulator is changed, a light of the third-order lower sideband wave ($f_0-3f_m$) is outputted from the reciprocating optical modulation system. By changing this modulating signal at a high speed, the frequency of the output light outputted from this system can be changed at a high speed. It is to be noted that while an example of a modulated optical signal generator using a light of the third-order sideband wave region is described in this operation example, frequency of the output light can also be changed by changing the transmission region of the second FBG (4).

3. Radio Signal Generator

Figure 6:
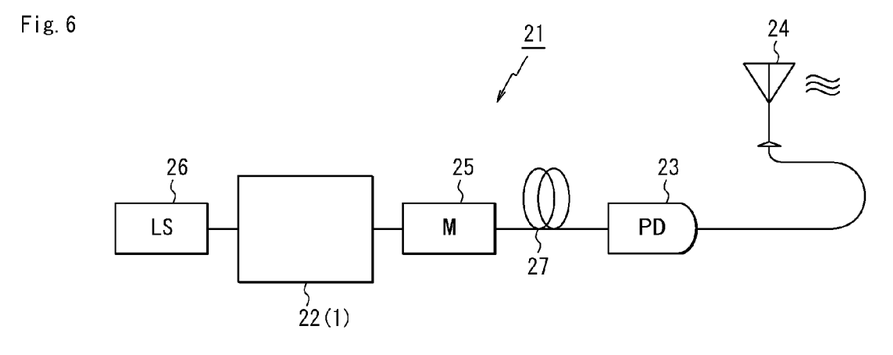
FIG. 6 is a block diagram showing a basic arrangement of a radio signal generator according to a second aspect of the present invention.

FIG. 6 is a block diagram showing a basic arrangement of a radio signal generator (21) according to the second aspect of present invention. As shown in FIG. 6, the radio signal generator (21) comprises a modulated optical signal generator (reciprocating optical modulation system (1)) (22) that is connectable to a light source, a photodetector (23) for detecting an output light from the modulated optical signal generator, and an antenna (24) for converting the optical signal detected by the photodetector into a radio signal. The radio signal generator (21) controls a modulating frequency of the modulated optical signal generator to control a frequency of the optical signal outputted from the multiplying optical modulator, and controls a frequency of the radio signal emitted from the antenna to generate a radio signal of a predetermined frequency. It is to be noted that a modulator (25) such as an optical intensifier for modulating the optical signal of the modulated optical signal generator may be provided between the modulated optical signal generator and the photodetector, a light source (26) for obtaining a light to be inputted to the modulated optical signal generator may be provided, and the components may be connected with each other with a transmission line (27) such as an SMF (single mode fiber).

4.1. Modulated Optical Signal Generator

For a modulated optical signal generator (22) connectable to the light source, the reciprocating optical modulation system (1) described above can be used as appropriate.

4.2. Photodetector

A photodetector is a means for detecting an output light of the modulated optical signal generator to be converted into an electric signal. For a photodetector, one that is publicly known can be adopted. For a photodetector, devices including a photodiode, for example, may be adopted. As a photodetector, one that detects an optical signal to be converted into an electric signal can be mentioned. With the photodetector, intensity, frequency, and the like of an optical signal can be detected. As the photodetector, one described in [Hiroo Yonezu, "optical communication device engineering"-photoemitter/photoreceptor device-, Kougakutosho Ltd. 6-th edition, 2000] may be appropriately adopted.

4.3. Antenna

An antenna is a means for emitting an electric signal converted by a photodetector as a radio signal. For an antenna, a publicly known antenna can be used.

5. Operation of Radio Signal Generator

The reciprocating optical modulation system (1) as the modulated optical signal generator (22) generates high-order sideband waves, which are detected by the photodetector and converted into radio signals by the antenna to be emitted as radio signals.

Example 1

Figure 7:
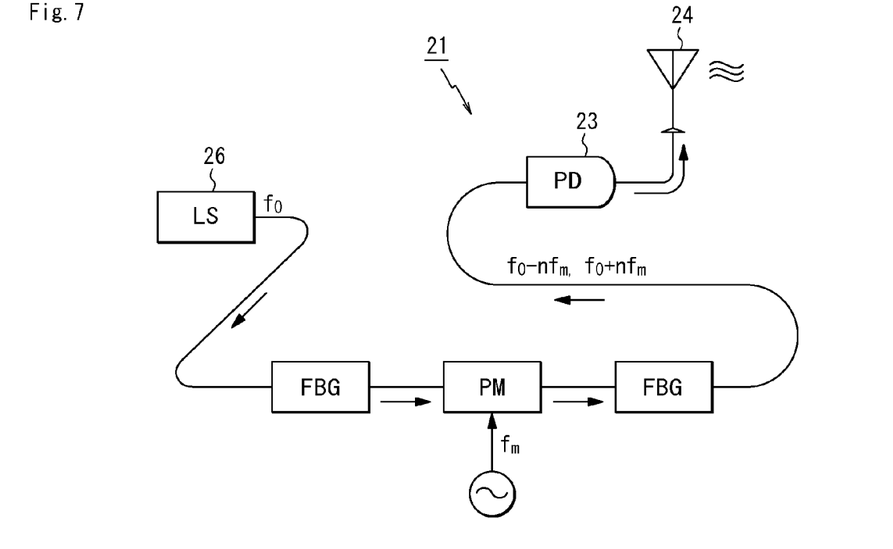
FIG. 7 is a diagram showing an arrangement of a radio signal generator for verifying that a reciprocating optical modulation system using fiber gratings functions.
Figure 8:
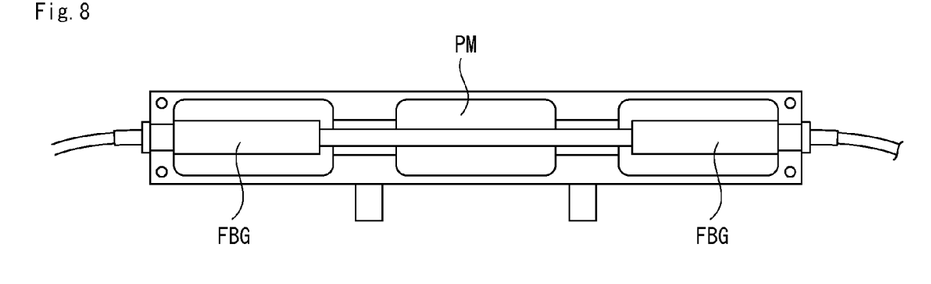
FIG. 8 is a diagram showing an arrangement of a reciprocating optical modulation system actually including two T-FBGs and a PM (phase modulator).

FIG. 7 is a diagram showing an arrangement of a radio signal generator for verifying that a reciprocating optical modulation system using fiber gratings functions. FIG. 8 is a diagram showing an arrangement of a reciprocating optical modulation system actually including two T-FBGs and a PM (phase modulator). In FIG. 8, FBG denotes a fiber grating and PM denotes a phase modulator, for which a traveling-wave-type was used. An RF signal was inputted to both of an RF signal input port and an RF signal output port. In FIG. 7, an LS (26) represents a light source. A light (wavelength of 1550 nm: let the frequency be $f_0$ in this example) from the light source is passed through an isolator which is not shown. An isolator manufactured by Newport Corporation was used for the isolator. This light was reflected between the FBGs, and passed though the FSK modulator a plurality of times. For the FBGs whose full width at half maximum is 47 GHz, those manufactured by 3M Company were used. Also, an optical delay in the two FBGs was 454.5 ps. For the optical modulator, one manufactured by Sumitomo-Osaka Cement Co., Ltd. was used. A modulating signal (fm) of 4.4 GHz with a power of 214 dBm was applied. The bandwidth at this time was approximately 20 MHz-100 MHz.

Figure 9:
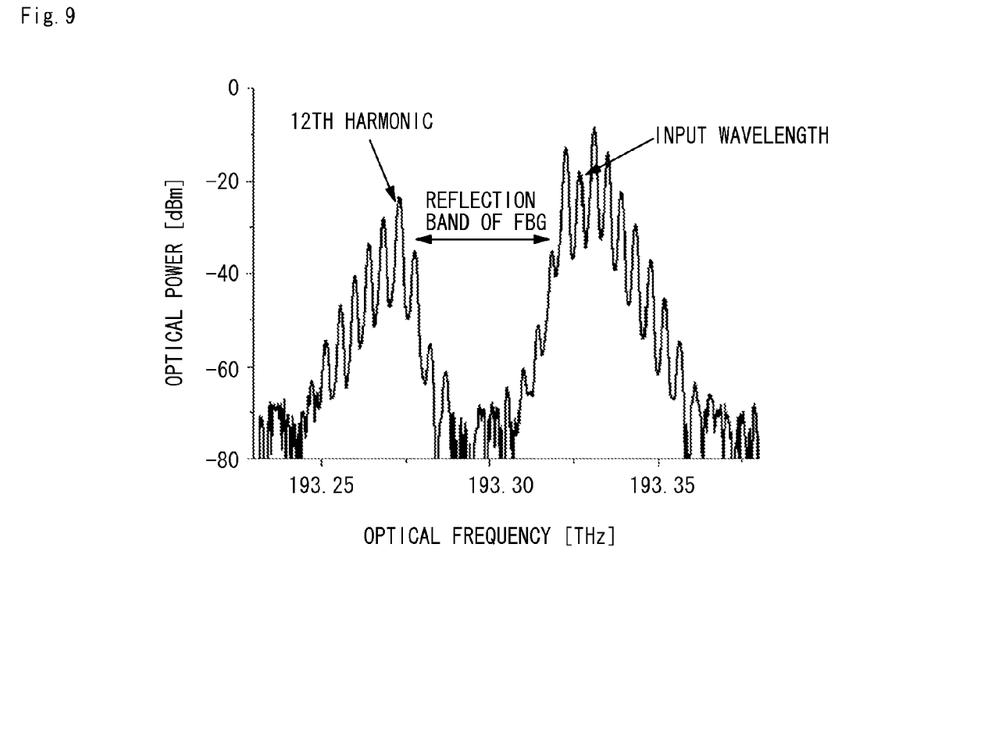
FIG. 9 shows spectra of an output light from the modulating signal generator.

FIG. 9 shows spectra of the output lights from the modulated signal generator. In FIG. 9, a plurality of lights were outputted such as the twelfth harmonic wave having shifted, in comparison with the carrier wave, a fixed number of times the modulating signal. Since lights of the reflecting region of the FBGs were reflected by the FBGs, the outputs thereof were suppressed. Also, while stable outputs could be obtained by shifting the frequency of the modulating signal, the frequencies rendering effective modulation were 2.2 GHz, 4.4 GHz, and 6.6 GHz. It is to be noted that in this example, even if an optical modulator such as an intensity modulator is substituted for the phase modulator, the upper sideband waves and the lower sideband waves can be similarly obtained.

Figure 10A:
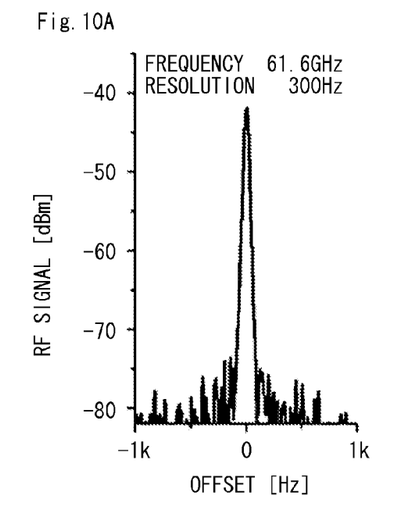
FIG. 10A is a spectrum diagram showing output spectra.
Figure 10B:
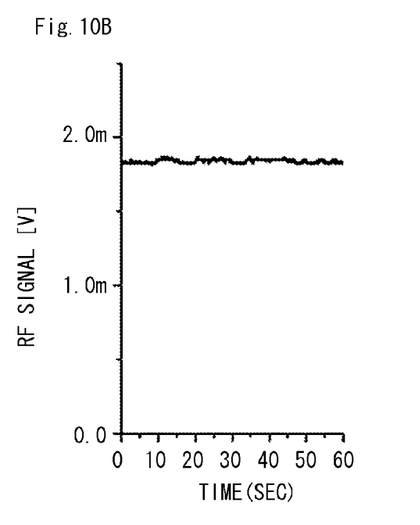
FIG. 10B is a graph showing a time fluctuation of an output radio signal.

FIGS. 10A and 10B are measurement results showing states of an output radio signal from a radio signal generator. FIG. 10A is a spectrum diagram showing output spectra. FIG. 10B is a graph showing a time fluctuation of an output radio signal. It is seen from FIG. 10A that with the radio signal generator of this example, a millimeter wave (radio signal) of a high signal purity could be obtained. Also, it is seen from FIG. 10B that a constant output can be maintained as the output of the millimeter signal.

The present invention can be suitably used in the field of the optical information and telecommunications or the like.

What is claimed is:

1. A reciprocating optical modulation system comprising:
   an optical modulator modulating an output light by controlling one of an intensity, a phase and a frequency of an input light;
   a first fiber grating transmitting a light of a first predetermined frequency domain, the light being outputted from the optical modulator and being inputted into the first fiber grating, the first fiber grating being configured to reflect lights of other frequencies than the first predetermined frequency domain;
   a second fiber grating transmitting a light of a second predetermined frequency domain, the light being outputted from the optical modulator and being inputted into the second fiber grating, the second fiber grating being configured to reflect lights of other frequencies than the second predetermined frequency domain; and
   a signal source generating a modulating signal to be inputted to the optical modulator,
   wherein both of the first fiber grating and the second fiber grating are chirp gratings, the gratings of the two chirp gratings being configured to be symmetrical with respect to the optical modulator.

2. A reciprocating optical modulation system comprising:
   an optical modulator modulating an output light by controlling one of an intensity, a phase and a frequency of an input light;
   a first fiber grating transmitting a light of a first predetermined frequency domain, the light being outputted from the optical modulator and being inputted into the first fiber grating, the first fiber grating being configured to reflect lights of other frequencies than the first predetermined frequency domain;
   a second fiber grating transmitting a light of a second predetermined frequency domain, the light being outputted from the optical modulator and being inputted into the second fiber grating, the second fiber grating being configured to reflect lights of other frequencies than the second predetermined frequency domain; and
   a signal source generating a modulating signal to be inputted to the optical modulator,
   wherein both of the first fiber grating and the second fiber grating chirp gratings, the gratings of the two chirp gratings being configured to opposite with respect to the optical modulator.

3. A reciprocating optical modulation system comprising:
   an optical modulator modulating an output light by controlling one of an intensity, a phase and a frequency of an input light;
   a first fiber grating transmitting a light of a first predetermined frequency domain, the light being outputted from the optical modulator and being inputted into the first fiber grating, the first fiber grating being configured to reflect lights of other frequencies than the first predetermined frequency domain;

a second fiber grating transmitting a light of a second predetermined frequency domain, the light being outputted from the optical modulator and being inputted into the second fiber grating, the second fiber grating being configured to reflect lights of other frequencies than the second predetermined frequency domain; and a signal source generating a modulating signal to be inputted to the optical modulator, wherein both of the first fiber grating (3) and the second fiber grating (4) are multi-section gratings, the gratings of the two multi-section gratings being configured to symmetrical with respect to the optical modulator.

4. A reciprocating optical modulation system comprising:

an optical modulator modulating an output light by controlling one of an intensity, a phase and a frequency of an input light;

a first fiber grating transmitting a light of a first predetermined frequency domain, the light being outputted from the optical modulator and being inputted into the first fiber grating, the first fiber grating being configured to reflect lights of other frequencies than the first predetermined frequency domain;

a second fiber grating transmitting a light of a second predetermined frequency domain, the light being outputted from the optical modulator and being inputted into the second fiber grating, the second fiber grating being configured to reflect lights of other frequencies than the second predetermined frequency domain; and a signal source generating a modulating signal to be inputted to the optical modulator, wherein both of the first fiber grating and the second fiber grating are multi-section gratings, the gratings of the two multi-section gratings being configured to opposite with respect to the optical modulator.

5. A radio signal generator comprising:

a reciprocating optical modulation system as a modulated optical signal generator connectable to a light source;

a photodetector detecting an output light from the modulated optical signal generator; and an antenna converting an optical signal detected by the photodetector into a radio signal, the radio signal generator controlling a modulating frequency of the modulated optical signal generator to control a frequency of an optical signal outputted from the multiplying optical modulator and controlling a frequency of the radio signal emitted from the antenna to generate a radio signal of a predetermined frequency, wherein the reciprocating optical modulation system comprising:

an optical modulator modulating an output light by controlling one of an intensity, a phase and a frequency of an input light;

a first fiber grating transmitting a light of a first predetermined frequency domain, the light being outputted from the optical modulator and being inputted into the first fiber grating, the first fiber grating being configured to reflect lights of other frequencies than the first predetermined frequency domain;

a second fiber grating transmitting a light of a second predetermined frequency domain, the light being outputted from the optical modulator and being inputted into the second fiber grating, the second fiber grating being configured to reflect lights of other frequencies than the second predetermined frequency domain; and a signal source generating a modulating signal to be inputted to the optical modulator, wherein at least one of the first fiber grating and the second fiber grating is selected form the group of a uniform fiber grating, a chirp grating and a multi-section grating.

* * * * *